United States Patent Office
3,748,299
Patented July 24, 1973

3,748,299
DOPES OF POLY(p-PHENYLENE TEREPHTHAL-
AMIDE) IN ORGANOPHOSPHORUS SOLVENTS
Michael Theodore Waroblak, Richmond, Va., assignor to
E. I. du Pont de Nemours and Company, Wilmington,
Del.
No Drawing. Filed July 26, 1972, Ser. No. 277,277
Int. Cl. C08g 51/44, 51/46, 51/50
U.S. Cl. 260—32.6 NA                        3 Claims

ABSTRACT OF THE DISCLOSURE

Spinning dopes of poly(p-phenylene terephthalamide) in combinations of selected organophosphorus compound and lithium chloride are provided.

This invention relates to novel, useful poly(p-phenylene terephthalamide) dopes consisting essentially of the polymer in a solvent system comprising a mixture of a selected organophosphorus compound and lithium chloride. Films and fibers may be prepared therefrom.

BACKGROUND OF THE INVENTION

The use of organophosphorus compounds such as phosphonates and phosphonothioates, e.g., diethyl ethylphosphonate and diethyl ethylphosphonothioate, as polymerization and solution-forming solvents for wholly aromatic polyamides has been described, e.g., in British patent specification 1,100,573. The utility of poly(p-phenylene terephthalamide) dopes, e.g., for fiber preparation, has been described in U.S. 3,671,542.

SUMMARY OF THE INVENTION

This invention provides novel, useful dopes comprising high molecular weight poly(p-phenylene terephthalamide), lithium chloride, and an organophosphorus compound selected from the group of:

(A) N,N-dimethyldimethylphosphinamide,

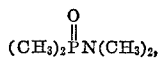

(B) N,N,N',N'-tetramethylmethylphosphondiamide,

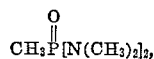

(C) N,N,N',N'-tetramethylethylphosphondiamide,

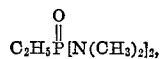

(D) N,N,N',N'-tetraethylmethylphosphondiamide,

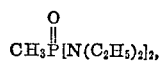

(E) triethylphosphine oxide,

(F) triisopropylphosphine oxide,

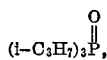

(G) 1,3-dimethyl-1-phospha-3-cyclopentene-1-oxide,

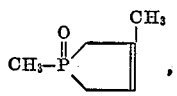

(H) 1-ethyl-3-methyl-1-phosphat-3-cyclopentene-1-oxide,

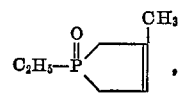

(I) 1-methyl-1-phosphacyclopentane-1-oxide,

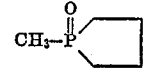

each ingredient present in proportions hereinafter disclosed.

In preparing the dopes of this invention, the use of compound (B), above, is preferred. Depending upon the particular organophosphorus compound selected from among (A)–(I), above, poly(p-phenylene terephthalamide) of inherent viscosity within the range 0.6–0.7 may be used in this invention. Under certain conditions, some of the dopes of this invention are optically anisotropic. Unexpectedly, each of the above compounds may be used in conjunction with lithium chloride to provide spinning dopes of poly(p-phenylene terephthalamide). Heretofore, inorganic acids or combinations of organic solvents have been required.

DESCRIPTION OF THE PREFERRED EMBODIMENTS

Useful polyamide

The poly(p - phenylene terephthalamide), (PPD-T), useful in this invention may be prepared by the low temperature solution polymerization processes described in U.S. 3,063,966 and 3,671,542. The polyamide may have an inherent viscosity of from about 0.6–6.7, measured as described hereinafter. Preferably, the polymer samples used to prepare the dopes of this invention exhibit inherent viscosity values of 1 or higher. The useful polymers may be chain terminated with an excess of either p-phenylene diamine or terephthaloyl chloride. Other useful terminators include, e.g., monoamines (e.g., methylamine), hydroxylic compounds (e.g., methyl alcohol), acid chlorides (e.g., acetyl chloride), dianhydrides (e.g., pyromellitic dianhydride), and other mono- and difunctional compounds.

Organophosphorus media

Organophosphorus compounds which are useful in the dopes of this invention may be obtained from commercial sources [e.g., as in the case of triethyl- and triisopropylphosphine oxides, (E), and (F)], or may be prepared by available procedures. For example, the preparation of 1-ethyl-3-methyl-1-phospha-3-cyclopentene-1-oxide (H) is described in Example 23 of McCormack U.S. 2,663,737. Quin et al. [J. Org. Chem. 33, 1034–1041 (1968)] illustrate the synthesis of 1-methyl-1-phospha-3-cyclopentene-1-oxide which may be catalytically reduced to 1-methyl-1-phosphacyclopentane-1-oxide (I) by the general methods shown in McCormack U.S. 2,663,739.

N,N-dimethyldimethylphosphinamide (A) may be prepared from dimethylphosphinic acid chloride [Reinhardt et al., Ber. 90, 1656–1660 (1957)] and dimethylamine via the amidation procedures described by Loev et al. in J. Org. Chem. 22, 1186–1189 (1957). N,N,N',N'-tetramethylmethylphosphondiamide (B), N,N,N',N' - tetramethylethylphosphondiamide (C), and N,N,N',N'-tetraethylmethylphosphondiamide (D) may be prepared from the appropriate alkylphosphonyl dichloride (e.g., methylphosphonyl dichloride; Kinnear et al., J. Chem. Soc. 1952, 3438–3445) by the general amidation techniques described by Loev et al. (loc. cit.).

Dope preparation

The dopes of this invention may be prepared by first combining appropriate quantities of the polyamide, lithium chloride, and an organophosphorus compound selected from the group of (A)–(I), cited hereinbefore. The resulting combination may then be stirred and heated, as required, to form a dope which can be extruded through spinneret orifices. Heating of the dope-forming ingredients is usually conducted within the temperature range of from about 60–90° C., preferably within about 60–70° C. Heating may be done with, e.g., an air gun, hot water bath, or other convenient means. When the preferred compound (B) above, is used, dopes are usually obtained without the need of heating, even when polyamides of high inherent viscosity (e.g., 6.7) are used.

On a weight basis, these dopes consist essentially of about 2–6% of PPD–T, 2–5% lithium chloride (preferably 2–3%), and the remainder a compound selected from the group of (A)–(I). Each of (A)–(I) is useful in forming dopes from PPD–T which exhibit an inherent viscosity value within about 0.6–1.6. Compounds (B), (C), (E), (G), (I) are useful for preparing dopes of even higher inherent viscosity PPD–T.

The singularly preferred compound is (B), N,N,N',N'-tetramethylmethylphosphondiamide, which is useful in preparing dopes of PPD–T of inherent viscosity as high as 6.7.

Compound (B) is further useful as a polymerization medium for preparing PPD–T of fiber-forming molecular weight, as illustrated in Example 11 herein. Compound (D) also has this utility (see Example 4).

Anisotropic dopes

Certain of the dopes of this invention are optically anisotropic, i.e., microscopic regions of a given dope are birefringent at rest; a bulk dope sample depolarizes plane-polarized light because the light transmission properties of the microscopic areas of the dope vary with direction. This characteristic is associated with the existence of at least part of the dope in the liquid crystalline or mesomorphic state.

The dopes of this invention which exhibit optical anisotropy do so while the dope is in the relaxed state. This is in contrast to conventional polyamide dopes may be caused to depolarize plane-deporarized light when subjected to appreciable shear.

There is a complex relationship existing among, e.g., the concentration of the polymer or copolymer species, the inherent viscosity thereof, salt content, and the temperature which generally determines the ranges in which a given dope is anisotropic. Details on qualitative and quantitative determinations of optical anisotropy of polyamide dopes are presented in U.S. 3,671,542. The dopes of this invention which are optically anisotropic are prepared with poly(p-phenylene terephthalamide), lithium chloride, and triisopropylphosphine oxide, as shown in Example 3.

The aforesaid U.S. 3,671,542 describes the improved properties (e.g., higher tenacity and initial modulus) in fibers spun from anisotropic, rather than isotropic, dopes.

Dope utility

From the dopes of this invention may be prepared various shaped articles, e.g., fibers, films, fibrids, etc. Fibers may be prepared by extruding the dopes of this invention, preferably via conventional wet spinning techniques. An appropriately prepared dope may be extruded into a suitable coagulating bath, e.g., a water bath maintained between about 50 to 70° C.

After being formed, the fibers may be treated with a finish composition and wound up on bobbins. Residual solvent and salt may be removed by soaking the bobbins, e.g., in water or alcohol, after which the fibers are dried. Removal of the salt and excess solvent may also be accomplished by passing the fiber through aqueous baths prior to the windup operation, by flushing the bobbins with water during windup, etc.

The dopes of this invention may be formed into strong self-supporting films by conventional wet extrusion methods. The solutions may also be used to prepare fibrids, useful for paper preparation, via the precipitation procedures described in Morgan—U.S. Pat. 2,999,788.

It will be understood that the usual additives such as dyes, fillers, antioxidants, etc., can be incorporated into the dopes of this invention for the purposes intended, prior to shaped article preparation.

MEASUREMENTS AND TESTS

Inherent viscosity

Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.5 gram of the polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C.; the solvent is concentrated sulfuric acid (95–98% $H_2SO_4$).

Fiber tensile properties

Filament properties are measured on fibers that have been conditioned at 21° C. and 65% relative humidity (R.H.) for at least 16 hours unless otherwise specified. Yarn properties are measured on yarn that has been conditioned at 24° C. and 55% R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on 3 filaments are averaged. Yarns are given 3 turns per inch (2.54 cm.) twist (under 0.1 g.p.d. tension) and broken with a 10 inch (25.4 cm.) gage length. All samples are elongated at a constant rate of extension (10% elongation/minute for fibers having an E of under 8%, and 60% elongation/minute for fibers with E of 8 to 100%) until the sample breaks.

The denier of a single filament (d.p.f.) is calculated from its functional resonant frequency, determined by vibrating a 7 to 9 cm. length of fiber under tension with changing frequency (ASTM D1577–66, part 25, 1968). This filament is then used for 1 break.

The denier of yarn is determined by weighing a known length (at 0.1 g.p.d. tension); 90 cm. length is convenient.

The tenacity (grams/denier), elongation (percent) and initial modulus (gram/denier) as defined in ASTM D2101, part 25, 1968, are obtained from the load-elongation curve and the measured denier. In actual practice, the measured denier of the sample, test conditions and sample identification are fed to a computer before the start of a test; the computer record the load-elongation curve of the fiber as it is broken and then calculates the fiber properties.

It should be noted that different values are obtained from single filaments (filament properties) and from multifilament strands (yarn properties) of the same sample. Unless specified otherwise all properties given herein are filament properties.

Optical anisotropy can be observed by the procedures described in U.S. 3,671,542.

EXAMPLE 1

This example illustrates the preparation of a poly(p-phenylene terephthalamide) dope in a mixture of N,N-dimethyldimethylphosphinamide and LiCl.

Poly(p-phenylene terephthalamide) ($\eta_{inh}=1.65$), (0.12 g.), LiCl (0.06 g.), and N,N-dimethyldimethylphosphinamide (1.82 g.) are combined and stirred together for several minutes to form a dope which contains 6% weight of the PPD–T.

EXAMPLE 2

This example illustrates the use of N,N,N',N'-tetramethylethylphosphondiamide, in combination with LiCl, to form an anisotropic dope of PPD–T.

Poly(p-phenylene terephthalamide) ($\eta_{inh}=1.6$), (0.06 g.), LiCl (0.03 g.) and N,N,N',N'-tetramethylethylphosphondiamide (0.91 g.) are combined in a test tube and gradually heated. The polymer dissolves to form an anisotropic dope.

EXAMPLE 3

Preparation of anisotropic dopes of PPD–T in a mixture of triisopropylphosphine oxide and LiCl is described in this example.

Poly(p-phenylene terephthalamide) ($\eta_{inh}=1$) (0.18 g.), LiCl (0.09 g.), and triisopropylphosphine oxide (2.73 g.) are combined, stirred together, and permitted to stand overnight at room temperature. After the combined ingredients are subsequently heated to about 70° C., an optically anisotropic dope is obtained.

In a similar manner an optically anisotropic dope is obtained when a polymer sample which exhibits an inherent viscosity of 1.6 is used. The dope (warmed) exhibits optical anisotropy when viewed through the crossed polarizers of a polarizing microscope.

EXAMPLE 4

This example illustrates the use of N,N,N',N'-tetraethylmethylphosphondiamide and LiCl to prepare poly(p-phenylene terephthalamide) dopes.

Part A

Poly(p-phenylene terephthalamide) ($\eta_{inh}=1.6$), (0.18 g.), LiCl (0.09 g.), and N,N,N',N'-tetraethylmethylphosphondiamide (2.73 g.) are combined, stirred, heated briefly with an air gun, then permitted to stand overnight at ambient temperature. When the ingredients are again heated, an anisotropic dope is formed.

Part B

Into a 50 ml. reaction vessel are placed, under anhydrous conditions, p-phenylenediamine (0.326 g.) and 11.1 g. of N,N,N',N'-tetraethylmethylphosphondiamide. A nitrogen atmosphere is established in the reaction vessel and the contents thereof are stirred. Terephthaloyl chloride (0.613 g.) is added after all the diamine is dissolved. Stirring is maintained overnight; precipitation occurs. Lithium carbonate (0.127 g.) is then added. The contents of the reaction vessel become a dope from which poly(p-phenylene terephthalamide) of inherent viscosity of 0.90 is obtained by precipitation with water and subsequent washing with acetone.

EXAMPLE 5

This example illustrates the use of a combination of triethylphosphine oxide and LiCl as a solvent system for PPD–T.

A combination of PPD–T ($\eta_{inh}=1.12$), (0.09 g.), LiCl (0.045 g.), and triethylphosphine oxide (1.365 g.) is heated at 70° C. for 1 hour to form a clear, isotropic dope containing 6% by weight of the polyamide. The use of PPD–T of inherent viscosity of 2.22 produces a similar dope after a 2 hour heating period at 70° C., as does a sample of the polymer exhibiting an inherent viscosity of 3.0 after several hours heating at 70° C.

EXAMPLE 6

The use of 1-ethyl-3-methyl-1-phospha-3-cyclopentene-1-oxide and LiCl to prepare a PPD–T dope is demonstrated herein.

Poly(p-phenylene terephthalamide) ($\eta_{inh}=1.0$) (0.12 g.), LiCl (0.06 g.), and 1-ethyl-3-methyl-1-phospha-3-cyclopentene-1-oxide (1.82 g.) are combined and warmed at 85° C. for 1 hour to form a dope.

EXAMPLE 7

The use of a combination of 1,3-dimethyl-1-phospha-3-cyclopentene-1-oxide and LiCl to form poly(p-phenylene terephthalamide) dopes is illustrated herein.

The combination of PPD–T ($\eta_{inh}=1.2$), (0.1 g.), LiCl (0.06 g.), and 1,3-dimethyl-1-phospha-3-cyclopentene-1-oxide (1.84 g.) is heated to 60° C. in a water bath. A clear, isotropic dope, containing 5% polymer, is obtained. A similar dope is obtained when the polymer sample employed exhibits an inherent viscosity of 3.2.

EXAMPLE 8

This example illustrates the use of 1-methyl-1-phosphacyclopentane-1-oxide and LiCl to prepare a dope of poly(p-phenylene terephthalamide).

Poly(p-phenylene terephthalamide) ($\eta_{inh}=1$), (0.06 g.), LiCl (0.03 g.), and 1-methyl-1-phosphacyclopentane-1-oxide (0.91 g.) are mixed and stirred at room temperature for several hours.

After combined ingredients are then heated with an air gun, a dope forms.

EXAMPLE 9

This example illustrates the preparation of an isotropic spinning dope of poly(p-phenylene terephthalamide) in a N,N,N',N'-tetramethylmethylphosphondiamide/LiCl solvent system and the spinning of fibers therefrom.

A spin dope is prepared by combining poly(p-phenylene terephthalamide) ($\eta_{inh}=4.2$, 9.0 g.), LiCl (4.5 g.), and N,N,N',N'-tetramethylmethylphosphondiamide (136.5 g.) and stirring the ingredients for 6 hours at room temperature. The resulting isotropic dope (containing 6% polymer and 3% LiCl) is wet spun into fibers under a variety of spinning conditions (12 bobbins of yarn are collected).

A portion of the dope is extruded through a 60-hole spinneret (each hole having a diameter of 0.0025 inch) into a water bath maintained at 25° C. The emerging filaments are wound up at 35 feet/minute, after which they are washed and dried. These filaments exhibit the following tensile properties: T/E/Mi: 4.6/13.5/134; Den.=1.6. Another portion of the dope is spun through the same type spinneret into a water bath maintained at 60° C. and the emerging filaments wound up at the rate of 70 feet/minute. After these filaments are washed and dried, they exhibit the following tensile properties: T/E/Mi: 4.6/11/191; Den. is 0.932.

EXAMPLE 10

This example illustrates the preparation of a strong film of poly(p-phenylene terephthalamide) from a dilute solution of the polymer in a solvent system comprising N,N,N',N'-tetramethylmethylphosphondiamide/LiCl.

A solution is prepared by combining appropriate quantities of poly(p-phenylene terephthalamide) ($\eta_{inh}$=6.70), LiCl, and N,N,N',N'-tetramethylmethylphosphondiamide such that a dope containing 2% by weight polymer and 2% by weight salt is obtained. This dope is cast into a very strong film which exhibits remarkable strength and elasticity.

EXAMPLE 11

This example illustrates the preparation of poly(p-phenylene terephthalamide) in N,N,N',N'-tetramethylmethylphosphondiamide.

Into a 100 ml. reaction flask equipped with a mechanically driven stirrer, drying tube, and nitrogen inlet tube are placed p-phenylenediamine (1.622 g.) and N,N,N',N'-tetramethylmethylphosphondiamide (50.0 g.). The flask is cooled, a nitrogen atmosphere established, and stirring begun. After all the diamine has dissolved, terephthaloyl chloride (3.043 g.) is added. The contents of the reaction vessel are stirred overnight. The precipitate which forms is collected, washed 5 times with water and once with acetone, and dried in an oven at 60° C. The dried sample of poly(p-phenylene terephthalamide) exhibits an inherent viscosity of 0.81.

EXAMPLE 12

This example illustrates the preparation of N,N,N',N'-tetramethylmethylphosphondiamide (B).

Into a 4-neck, 3 liter round bottom flask fitted with a mechanical stirrer, thermometer, reflux condenser, and containing 1,500 ml. of n-heptane, is added dimethylamine (355 g.; 7.9 moles). The flask and contents are then cooled in a bath of ice and water. A solution of methylphosphonyldichloride (229 g.; 1.7 moles) in 450 ml. of n-heptane is added dropwise to the flask through an addition funnel at a rate whereby the temperature of the reactants does not exceed 30° C. After the addition is complete, the cooling bath is removed and the reaction mixture is slowly heated to reflux. Reflux is maintained for 24 hours, after which the brown solid present in the flask is removed via filtration. The filtrate is placed in a rotary evaporator apparatus and the solvent is removed. The residue in the evaporator is distilled through a Vigreaux column under reduced pressure provided by a water aspirator. Three separate fractions are collected at 120° C./20–30 mm. Hg. Nuclear magnetic resonance (NMR) and infrared (IR) spectra confirm the structure of these fractions as N,N,N',N'-tetramethylmethylphosphondiamide; vapor phase chromatography (VPC) analyses show the purity to be greater than 99%.

EXAMPLE 13

This example illustrates the preparation of N,N,N',N'-tetramethylethylphosphondiamide (C).

A 3-neck 2 liter round bottom flask containing 300 ml. of n-hexane is cooled to 0° C. with a bath of ice and acetone. The flask is then fitted with a thermometer, addition funnel (with drying tube), and mechanical stirring unit. Dimethylamine (32.4 g; 0.72 mole) is added with stirring to the cooled hexane. A solution of ethylphosphonyl dichloride (27 g.; 0.18 mole) in 300 ml. of n-hexane is added, with stirring, to the flask via the addition funnel. The rate of addition is such that the temperature within the reaction flask does not exceed 5° C. After the addition is completed, the cooling bath is removed and the contents of the flask are stirred at autogenous temperature for 0.5 hour. The contents of the flask are then heated (electric mantle) to reflux. Reflux is maintained overnight, after which the reaction mixture is permitted to cool. The white precipitate present in the flask is removed by filtration and the filtrate evaporated on a rotary evaporator. To the residue of the evaporation are added three ml. of 30% aqueous sodium hydroxide solution. This combination is stirred, after which the aqueous basic solution is separated from the organic layer. The organic layer is dried over magnesium sulfate, separated from the drying agent by filtration, and distilled under reduced pressure. Two fractions of N,N',N'-tetramethylethylphosphondiamide are collected: (1) at 45° C./0.3 mm. and (2) at 75° C./0.7 mm. The structure and purity of the product are confirmed by NMR, IR, and VPC analyses.

EXAMPLE 14

This example illustrates the preparation of N,N,N',N'-tetraethylmethylphosphondiamide (D).

Into a 3-neck, 3 liter round bottom flask equipped with a nitrogen inlet tube, drying tube, mechanical stirrer, and addition funnel is placed diethylamine (365.0 g.; 5.0 moles). To this is added approximately 1,000 ml. of n-heptane. This mixture is cooled to about 0–5° C. with an external bath of ice and acetone. While the reaction mixture is stirred and the 0°–5° C. temperature range maintained, a solution of methylphosphonyldichloride (133 g.; 1 mole) in 300 ml. of n-heptane is added gradually over a period of approximately 2.5 hours. When the addition is complete, the cooling bath is removed and the reaction mixture is stirred for 0.5 hour at autogenous temperature. The reaction is then equipped with a water-cooled reflux condenser, heated and refluxed overnight (electric mantle), after which the solid in the flask is removed by filtration and the filtrate evaporated on a rotary evaporator. The residue in the rotary evaporator is distilled under reduced pressure and three fractions collected: (1) 140° C./20 mm.; (2) 145° C./20 mm.; (3) 145° C./20 mm. IR analysis of (2) confirms the structure to be that of N,N,N',N'-tetraethylmethylphosphondiamide.

The distillate, dissolved in 400 ml. of hexane, is treated with 25 ml. of 30% aqueous sodium hydroxide for 2 hours, after which the organic and aqueous layers are separated. The n-hexane is removed from the organic layer and the residue is distilled on a spinning band column. Two fractions are collected: (1–A) 93° C./3 mm.; (2–A) 95° C./2 mm. NMR and VPC analyses of these fractions confirm the structure and purity (>99%) of the desired product.

EXAMPLE 15

This example illustrates the preparation of N,N-dimethyldimethylphosphinamide (A).

Into a 3-neck, 500 ml. round bottom flask equipped with stirrer, addition funnel, and drying tube is placed dimethylamine (16.2 g.; 0.36 mole) dissolved in approximately 200 ml. anhydrous ether. This solution is cooled with a bath of ice and acetone and stirring is begun. Solid dimethylphosphonylchloride (23.5 g.; 0.21 mole) and 125 ml. ether are then added to the flask. When the addition is complete, the cooling bath is removed and the reaction permitted to stir for 1 hour at autogenous temperature. After the contents of the flask have cooled, the precipitate present is removed by filtration and the filtrate evaporated on a rotary evaporator. The residue remaining in the evaporator (9.0 g.) is distilled through a distillation column, under reduced pressure. A fraction of this distillate is collected at 65° C./0.5 mm. This fraction is combined with a fraction obtained from a similar sized synthesis conducted in a mixture of ether and benzene and the combination is distilled through a spinning band column. The fraction collected at 76° C./1.7 mm. can be shown by IR analysis to contain the desired product.

What is claimed is:

1. A spinning dope consisting essentially of about 2 to 6% by weight of poly(p-phenylene terephthalamide), about 2 to 5% by weight of lithium chloride and the remainder a solvent selected from the group consisting of:
N,N-dimethyldimethylphosphinamide
N,N,N',N'-tetramethylmethylphosphondiamide
N,N,N',N'-tetramethylethylphosphondiamide
N,N,N'-N'-tetraethylmethylphosphondiamide
triethylphosphine oxide
triisopropylphosphine oxide 1,3-dimethyl-1-phospha-3-cyclopentene-1-oxide
1-ethyl-3-methyl-1-phospha-3-cyclopentene-1-oxide
1-methyl-1-phosphacyclopentane1-oxide.

2. The dope of claim 1 wherein the polymer inherent viscosity is between 0.6 and 1.6.

3. The dope of claim 1 wherein the solvent is N,N,N',N'-tetramethylmethylphosphondiamide.

References Cited

UNITED STATES PATENTS

| 3,671,542 | 6/1972 | Kwolek | 260—30.8 R |
| 3,063,966 | 11/1962 | Kwolek | 260—78 |
| 3,453,244 | 7/1969 | Preston | 260—78 |
| 2,642,406 | 6/1953 | Dickey | 260—30.6 |

FOREIGN PATENTS

| 1,100,573 | 1968 | Great Britain. |

MORRIS LIEBMAN, Primary Examiner

R. ZAITLEN, Assistant Examiner

U.S. Cl. X.R.

260—30.2 R, 30.6 R